US012734634B2

(12) United States Patent
Sato et al.

(10) Patent No.: US 12,734,634 B2
(45) Date of Patent: Sep. 15, 2026

(54) METAL SHEET FORMING LIMIT DETERMINATION METHOD AND FORMING LIMIT DETERMINATION SYSTEM, AND COMPUTER PROGRAM

(71) Applicant: JFE STEEL CORPORATION, Tokyo (JP)

(72) Inventors: Kentaro Sato, Tokyo (JP); Yuta Kariyazaki, Tokyo (JP); Toru Inazumi, Tokyo (JP); Yutaka Takahashi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 393 days.

(21) Appl. No.: 18/684,260

(22) PCT Filed: Aug. 29, 2022

(86) PCT No.: PCT/JP2022/032391
§ 371 (c)(1),
(2) Date: Feb. 16, 2024

(87) PCT Pub. No.: WO2023/032910
PCT Pub. Date: Mar. 9, 2023

(65) Prior Publication Data

US 2026/0158605 A1 Jun. 11, 2026

(30) Foreign Application Priority Data

Sep. 1, 2021 (JP) ................................ 2021-142454

(51) Int. Cl.
*B23Q 15/12* (2006.01)
*B21C 51/00* (2006.01)
(Continued)

(52) U.S. Cl.
CPC .............. *B23Q 15/12* (2013.01); *B21C 51/00* (2013.01); *G01L 5/00* (2013.01); *G01N 3/00* (2013.01);
(Continued)

(58) Field of Classification Search
USPC .......................................................... 702/108
See application file for complete search history.

(56) References Cited

U.S. PATENT DOCUMENTS 11,016,011 B2 * 5/2021 Nitta ........................ G01N 3/28
2008/0004850 A1 * 1/2008 Wang ...................... G06F 30/23 703/13
(Continued)

FOREIGN PATENT DOCUMENTS

CN 109470559 A 3/2019
JP 2007-285832 A 11/2007
(Continued)

OTHER PUBLICATIONS

Oct. 11, 2022 International Search Report issued in International Patent Application No. PCT/JP2022/032391.
(Continued)

*Primary Examiner* — Paul D Lee
(74) *Attorney, Agent, or Firm* — Oliff PLC

(57) ABSTRACT

A metal sheet includes a forming test step that forms a test specimen with an arbitrary lattice or a pattern for strain analysis while capturing an image of the surface, analyzing images obtained during the forming to measure the strain, and storing the strain in time series from the start of the forming to the occurrence of fracture to construct a strain database; and a forming limit analysis step includes setting, an evaluation point sequence for acquiring a strain distribution in the vicinity of a portion where fracture has occurred, extracting strain corresponding to the position of the evalu-
(Continued)

ation point sequence in an arbitrary forming step from the strain database, calculating an approximation strain curve corresponding to the position of the point sequence, determining, the difference between the strain based on the approximation strain curve and analyzing the images, and determining a forming limit based on the obtained approximation error.

9 Claims, 13 Drawing Sheets

(51) Int. Cl.

| | |
|---|---|
| ***G01L 5/00*** | (2006.01) |
| ***G01N 3/00*** | (2006.01) |
| ***G01N 3/28*** | (2006.01) |
| *C21D 9/46* | (2006.01) |
| *G06F 113/24* | (2020.01) |

(52) U.S. Cl.

CPC ................. *G01N 3/28* (2013.01); *C21D 9/46* (2013.01); *G06F 2113/24* (2020.01)

(56) References Cited

U.S. PATENT DOCUMENTS

2009/0056468 A1* 3/2009 Kubli ...................... G06F 30/15 73/826
2015/0294043 A1* 10/2015 Sonobe .................. B21D 22/02 703/2
2016/0161382 A1* 6/2016 Yonemura ................ G01N 3/20 73/851
2016/0328503 A1 11/2016 Zhu et al.
2019/0212236 A1 7/2019 Aitoh et al.
2020/0025659 A1* 1/2020 Aitoh ...................... G06F 30/23

FOREIGN PATENT DOCUMENTS

| | | |
|---|---|---|
| JP | 2014-240774 A | 12/2014 |
| JP | 2016-212863 A | 12/2016 |
| JP | 2016-215242 A | 12/2016 |
| JP | 2017-140653 A | 8/2017 |
| JP | 2019-158415 A | 9/2019 |
| WO | 2018/066673 A1 | 4/2018 |

OTHER PUBLICATIONS

"Metallic Materials—Determination of Forming-Limit Curves for Sheet and Strip—Part 2: Determination of Forming-Limit Curves in the Laboratory". ISO 12004-2: 2021.

Walter Hotz et al. "Time Dependent FLC Determination Comparison of Different Algorithms to Detect the Onset of Unstable Necking Before Fracture". Key Engineering Materials, 2013, vol. 549, pp. 397-404.

W. Volk et al. "New Algorithm for a Robust User-Independent Evaluation of Beginning Instability for the Experimental FLC Determination". International Journal of Material Forming, 2011, vol. 4, pp. 339-346.

Oct. 25, 2024 Extended Search Report issued in European Patent Application No. 22864492.8.

Song, Yang et al. "Investigation of various necking criteria for sheet metal formability analysis using digital image strain data." International Journal of Material Forming. vol. 13, pp. 1015-1024, 2020.

* cited by examiner

FORMED STATE OF TEST SPECIMEN
ERROR ANALYSIS
APPROXIMATION CURVE
NO NECKING OCCURRED
NECKING OCCURRED
50
75
dEx=0.006
dEy=0.001
dEx=0.079
dEy=0.008
dEx
Max/Min.Strain
(0.117,0.024) - (0.049,-0.044)
(0.190,0.009) - (0.143,-0.039)

φ100

W48

W32

2
6
1
4
3

6
1
2
3
4

METAL SHEET FORMING LIMIT DETERMINATION METHOD AND FORMING LIMIT DETERMINATION SYSTEM, AND COMPUTER PROGRAM

TECHNICAL FIELD

The present invention relates to a method for determining the forming limit of a metal sheet, such as a steel sheet, when it is press formed, a system therefor, and a computer program. In particular, the present invention relates to a data analysis method for quantitatively determining a forming limit with less variation than those of the conventional technologies.

BACKGROUND ART

A steel sheet is a type of metal sheet that is commonly used as material for an automobile vehicle body, and is often pressed to form each part of the vehicle body. The press formability of each part varies depending on the shape of the part, and is also greatly influenced by the properties, such as ductility, of the material of the part. In recent years, steel sheets with higher strength have been developed in response to the increasing demand for improved collision safety of vehicle bodies. However, this results in lower ductility of the steel sheets at the same time. Therefore, more steps have been taken in the design of a die, using CAE (Computer-Aided Engineering) to check the press formability of each part in advance. This has increased the need to grasp the forming limits of the steel sheets.

To determine the forming limit of a metal sheet such as a steel sheet, a forming limit diagram (FLD) is usually used. The forming limit diagram is determined by measuring the forming limit of each deformation pattern during press forming, such as equibiaxial deformation, non-equibiaxial deformation, plane strain deformation, or uniaxial deformation, for example, through laboratory-scale forming tests. Since changing the width of a test specimen causes the deformation ratio of the test specimen in the X-direction and the Y-direction (i.e., directions orthogonal to each other) to change correspondingly, the width of the test specimen is changed in several levels to measure the amounts of strain in the X-direction and the Y-direction upon fracture of the test specimen. For example, Patent Literature 1 discloses a testing method for the forming limit of a metal sheet.

In a forming test, a steel sheet typically first deforms uniformly. Then, strain is concentrated at a particular position on the steel sheet, where a reduction in the thickness of the steel sheet occurs. This phenomenon is called necking. The steel sheet fractures after the reduction in the thickness of the steel sheet further proceeds. In press forming, a product with necking is regarded as a failure. Therefore, the forming limit line for the steel sheet should be defined based on the amount of strain immediately before necking.

In particular, a high-strength steel sheet with a tensile strength of over 980 MPa causes necking at a small amount of strain (about 10%), and immediately fractures. Therefore, the forming limit of the steel sheet needs to be determined with high accuracy, and in response, methods for determining forming limits with high accuracy have been proposed.

In Non Patent Literature 1, a method for identifying a forming limit curve is standardized as in FIG. 12. The method includes measuring a strain distribution around fracture of a test specimen formed until it has fractured as indicated by a plot 1 in FIG. 12, approximating the strain distribution to a curve of Expression (1) below as indicated by a solid line 2 in FIG. 12, and then calculating the maximum value of the strain indicated by an arrow 6 in FIG. 12 from Expression (1) below so as to determine the maximum value of the strain as the forming limit.

$$Ex = 1/(ax^2 + bx + c) \tag{1}$$

Since the method of Non Patent Literature 1 does not directly measure the forming limit, methods of Non Patent Literature 2 and Non Patent Literature 3 have also been proposed as the improvements to Non Patent Literature 1. Both methods of Non Patent Literature 2 and Non Patent Literature 3 continuously measure strain during forming so as to identify a forming limit from time variation in strain in a portion where fracture has occurred.

CITATION LIST

Patent Literature

Patent Literature 1: JP-2016-215242A

Non Patent Literature

Non Patent Literature 1: ISO 12004-2:2021

Non Patent Literature 2: W Hotz, M Merklein et al., "Time Dependent FLC Determination Comparison of Different Algorithms to Detect the Onset of Unstable Necking before Fracture", Key Engineering Materials, Vol 549, pp. 397-404 (2013).

Non Patent Literature 3: W Volk, P Hora, "New algorithm for a robust user-independent evaluation of beginning instability for the experimental FLC determination", International Journal of Material Forming, Vol 4, pp. 339-346 (2011).

SUMMARY OF INVENTION

Technical Problem

A material testing method for a metal sheet is required to be a simple yet highly accurate method that can reproduce a complex phenomenon as it actually occurs, with little variation. In this point, a metal sheet forming limit determination method needs to determine fracture strain immediately before necking occurs, with high accuracy. However, the conventional determination methods could not reproduce necking as it actually occurred, which was problematic.

The method proposed in Non Patent Literature 1 determines a forming limit by approximating strain generated upon occurrence of fracture using Expression (1). However, a high-strength steel sheet with a tensile strength of 980 MPa or more generates a small amount of strain when fracture occurs, causing a problem in that an approximate expression cannot be determined with sufficient accuracy. For example, FIG. 13 shows an example in which a secondary peak of strain occurs in the vicinity of a portion where fracture is caused, such as in the range of L1 in FIG. 13. Such a case is likely to occur in a high-strength steel sheet with low ductility. An approximation curve, when calculated in this situation, causes a problem in that the amount of strain at a forming limit would be overestimated due to the influence of the secondary peak.

The methods described in Non Patent Literature 2 and Non Patent Literature 3 are to identify a forming limit based on the time history of changes in the strain at the position where fracture has occurred. These methods are unlikely to be influenced by the surrounding of the position where fracture occurs, unlike in Non Patent Literature 1. As shown in FIG. 14, a forming limit is identified based on the linear approximation of changes in the strain in the sheet thickness direction immediately before fracture occurs with the start point of necking determined to be the intersection with the approximation straight line until necking starts. However, the forming limit identified with such a method is often far larger than the necking limit point at which forming is determined to be difficult at an actual press forming operation. This makes it difficult to use the method to determine the press formability.

The present invention has been made in view of the foregoing circumstances, and it is an object of the present invention to provide a metal sheet forming limit determination method for quantitatively determining a forming limit with less variation, a system therefor, and a computer program.

Solution to Problem

A metal sheet forming limit determination method according to the present invention that advantageously solves the foregoing problems is a metal sheet forming limit determination method including a forming test step and a forming limit analysis step for a metal sheet. The method is characterized in that the forming test step includes a step of preparing a test specimen of a metal sheet with an arbitrary lattice or a pattern for strain analysis displayed on the surface, a step of forming the test specimen while capturing an image of the surface of the test specimen with the lattice or the pattern for strain analysis displayed on the surface, a step of analyzing images captured sequentially during the forming to measure strain generated in the metal sheet, and a step of storing the measured strain in time series from a start of the forming to occurrence of fracture to construct a strain database. The method is also characterized in that the forming limit analysis step includes a step of setting, on the test specimen, an evaluation point sequence for acquiring a strain distribution in the vicinity of a portion where fracture occurs, a step of extracting, from the strain database, the strain at a position of the evaluation point sequence in an arbitrary forming step, a step of calculating, from the extracted strain, an approximation strain curve corresponding to the position of the evaluation point sequence, a step of determining, as an approximation error, a difference between the strain at the position of the evaluation point sequence based on the calculated approximation strain curve and strain at the position of the evaluation point sequence measured by analyzing the images, and a step of determining a forming limit based on the obtained approximation error.

Note that the metal sheet forming limit determination method according to the present invention may include the following solution means, which are considered to be more preferable.

(a) The approximation strain curve is a polynomial function.

(b) The step of determining a forming limit includes determining that necking has occurred in a forming step in which the approximation error has exceeded a predetermined threshold and determining, as the forming limit, strain at the evaluation point sequence on the metal sheet in the forming step or one step earlier than the forming step.

(C) The step of determining a forming limit displays the approximation strain curve, and a strain distribution in the vicinity of the evaluation point sequence.

(d) The forming test step includes performing forming tests for a plurality of test specimens having different shapes, and the forming limit analysis step includes determining a forming limit for each test specimen to obtain a forming limit line.

A metal sheet forming limit determination system according to the present invention that advantageously solves the foregoing problems is a metal sheet forming limit determination system including a forming test machine, a strain measuring device, and a forming limit analysis device. The metal sheet forming limit determination system is characterized in that:

the forming test machine is configured to perform press forming by, while clamping a test specimen of a metal sheet with an arbitrary lattice or a pattern for strain analysis displayed on the surface between a die and a blank holder, pressing a central portion of the test specimen with a tip end of a punch that is fitted into a forming test portion in a central hole of the die through a central hole of the blank holder, and includes an image-capturing means for capturing an image of the surface of the test specimen during the press forming; that the strain measuring device includes an image analysis unit that analyzes images of the surface of the test specimen obtained by the image-capturing means to acquire a strain distribution, a strain measurement unit that calculates strain from the obtained strain distribution, and a strain data accumulation unit that stores strain in time series from a start of the forming to occurrence of fracture to construct a strain database; and that the forming limit analysis device includes a strain extraction unit that sets, on the test specimen, an evaluation point sequence for acquiring a strain distribution in the vicinity of a portion where fracture occurs, and extracts the strain at a position of the evaluation point sequence in an arbitrary forming step from the strain database of the strain data accumulation unit, a strain curve approximation unit that calculates from the extracted strain an approximation strain curve corresponding to the position of the evaluation point sequence, an approximation error analysis unit that determines, as an approximation error, a difference between the strain at the position of the evaluation point sequence based on the calculated approximation strain curve and strain at the position of the evaluation point sequence measured by analyzing the images, and a forming limit determination unit that determines a forming limit based on the obtained approximation error.

Note that the metal sheet forming limit determination system according to the present invention may include the following feature as a solution means that is considered more preferable: the forming test machine has a drive plate interposed between the test specimen and the punch, or the metal sheet forming limit determination system further includes a display device that displays the approximation strain curve, and a strain distribution in the vicinity of the evaluation point sequence.

A computer program according to the present invention that advantageously solves the foregoing problems is a computer program for executing any one of the foregoing metal sheet forming limit determination methods, and is characterized by causing a computer to function as a forming test means and forming limit analysis means.

Advantageous Effects of Invention

The method and system according to the present invention are a method and system for approximating strain data, which has been stored in time series in a forming test, to a curve based on a strain distribution in the vicinity of a portion where fracture occurs for each forming step, thereby determining an error at the position of an evaluation point sequence so as to determine if necking has occurred. According to the present invention, it is possible to determine a forming limit while confirming the validity of the determination of the forming limit, by displaying the results of the approximation of the strain distribution on a computer display or the like, and thus to identify the forming limit more accurately than those of the conventional methods. It is also possible to make a quantitative determination of the forming limit by setting an error threshold to determine the occurrence of necking.

DESCRIPTION OF EMBODIMENTS

Embodiments of the present invention will be specifically described below. It should be noted that the drawings are schematic and may differ from the actual ones. In addition, the following embodiments illustrate examples of a system and method for embodying the technical idea of the present invention, and thus, the configuration of the present invention is not limited to the one described below. That is, the technical idea of the present invention may be modified in various ways within the technical scope recited in the claims.

Figure 1:
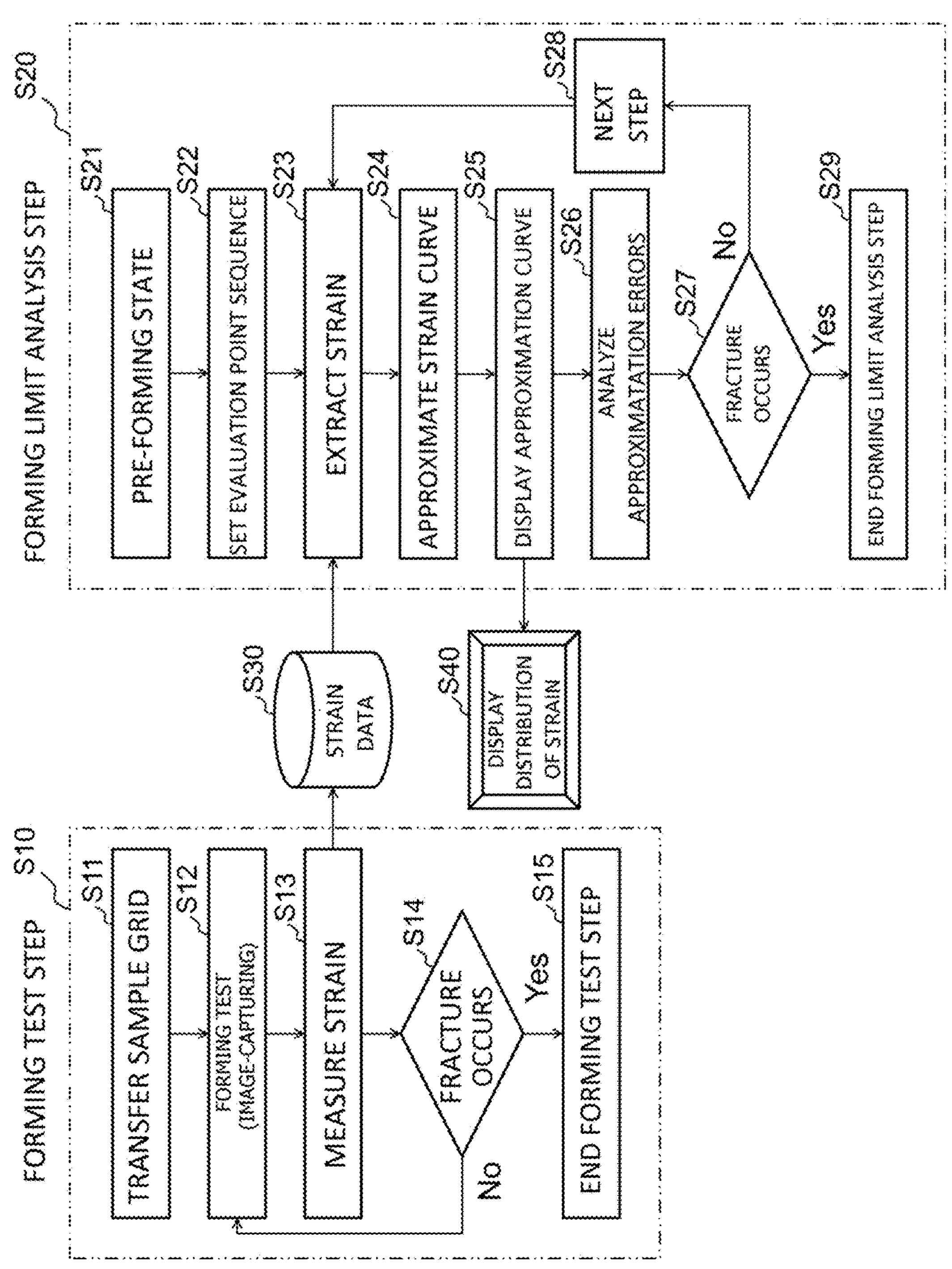
FIG. 1 is a flowchart of a forming limit determination method according to an embodiment of the present invention.

A metal sheet forming limit determination method according to an embodiment of the present invention includes two steps that are a forming test step (S10) and a forming limit analysis step (S20) as shown in a flowchart of FIG. 1. Each step is carried out in the following procedures.

In the forming test step (S10), a metal sheet is first prepared as a test specimen by transferring a sample grid and the like to the surface so that an arbitrary lattice or a pattern for strain analysis is displayed on the surface (S11). The metal sheet is formed while its surface with the lattice or the pattern for strain analysis displayed is captured (S12). The images sequentially captured during the forming are analyzed by an image analysis device to measure a strain distribution (S13). The representative values of the strain generated in the test specimen are measured from the measured strain distribution (S13), and are stored in a strain database (S30). The measured representative values of the strain are preferably the values of the maximum principal strain and the minimum principal strain that have no shear strain components. The measured representative values of the strain may be also the values of the strain in the X-direction and the strain in the Y-direction on the space coordinates, or the strain in the sheet thickness direction. Time-series changes in the strain distribution are repeatedly stored until fracture occurs while the forming step gradually proceeds (S14). Then, the strain database (S30) storing data from the start of the forming to the occurrence of the fracture is constructed.

The forming limit analysis step (S20) involves the following steps. First, a pre-forming state is ascertained (S21). Next, an evaluation point sequence is set to obtain a strain distribution in the vicinity of the fracture (S22). The evaluation point sequence is preferably arranged in the direction of the maximum principal strain. The representative values of strain at the position of the evaluation point sequence in an arbitrary forming step are extracted from the strain database (S30) storing time-series data (S23). An approximation curve of the strain corresponding to the evaluation point sequence on the metal sheet is calculated (S24). To calculate the approximation curve, a polynomial function, such as a secondary function, is preferably used. The difference between the strain at the evaluation point sequence based on the calculated approximation strain curve and strain at the evaluation point sequence measured by analyzing the images is determined as an approximation error (S26). The forming limit is determined based on the obtained approximation error (S26). The approximation strain curve and the distribution of the strain around the evaluation point sequence are displayed (S25 and S40). It is preferable to proceed with the analysis of the forming limit while confirming the validity of the analysis.

When the approximation error, which is the difference between the strain corresponding to the evaluation point sequence based on the calculated approximation strain curve and the strain at the evaluation point sequence measured by analyzing the images, is small, it can be determined that uniform forming is proceeding without the occurrence of necking. When necking occurs, strain locally grows, resulting in a larger approximation error. Thus, evaluating the approximation error can determine if necking has occurred. When the approximation error exceeds a predetermined threshold, it is determined that necking has occurred, and the amount of strain at that instant is determined to be the forming limit (S27), and the analysis ends at that point (S28 and S29). Alternatively, when the approximation error exceeds the predetermined threshold, it is determined that necking has occurred, and the amount of strain one step earlier is determined to be the forming limit (S27), and the analysis ends at that point (S28 and S29).

In the present embodiment, the forming limit is analyzed (S20) using the strain database (S30) accumulated in the forming test step (S10). An initially set evaluation point sequence in the vicinity of a portion where fracture has occurred is approximated by a curve defined by a polynomial such as Expression (a) below, using, for example, the maximum principal strain data as a representative value of strain.

$$E_1(x)=\alpha_1x^2+\beta_1x+\gamma_1 \tag{a}$$

The value of each coefficient is determined such that the least squares error of the polynomial is minimized for multiple strain in the evaluation point sequence. Next, curve approximation is performed in the same way using Expression (b) below for the minimum principal strain in the direction orthogonal to the maximum principal strain.

$$E_2(x)=\alpha_2x^2+\beta_2x+\gamma_2 \tag{b}$$

For the maximum principal strain, an error analysis is performed between the measured value for each evaluation point sequence and the value of the approximation curve to calculate an approximation error dEx (j), wherein j is an index representing each position of the evaluation point sequence. The maximum value of dEx (j) is determined as the approximation error dEx of the relevant forming step.

The approximation results are displayed on a screen, so that it can be determined if necking has occurred by checking the image of the strain distribution and the states of the approximation curves for a formed product. When the approximation error is smaller than the threshold described above and the measured strain at the evaluation point sequence is located sufficiently on the approximation strain curve, it is determined that necking has not occurred, followed by the analysis of strain for the next forming step. When the state of the formed product approaches the state in which fracture occurs after the above operation is continued, strain gradually becomes locally concentrated. When the strain concentration becomes high and an error with respect to the approximation curve thus becomes large, it is possible to determine that necking has occurred.

Figure 2:
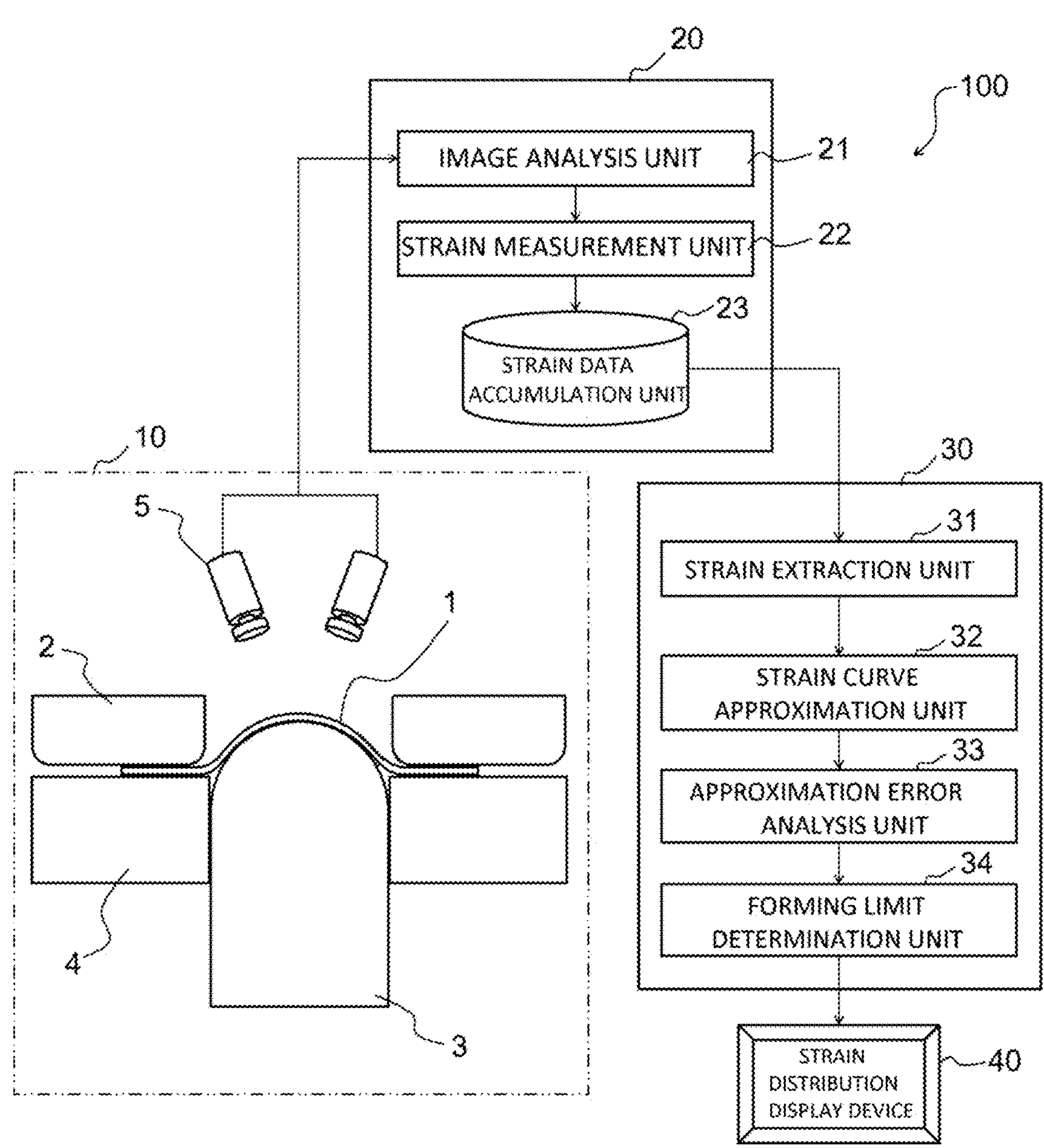
FIG. 2 is a schematic block diagram illustrating a configuration example of a forming limit determination system according to an embodiment of the present invention.
Figure 3:
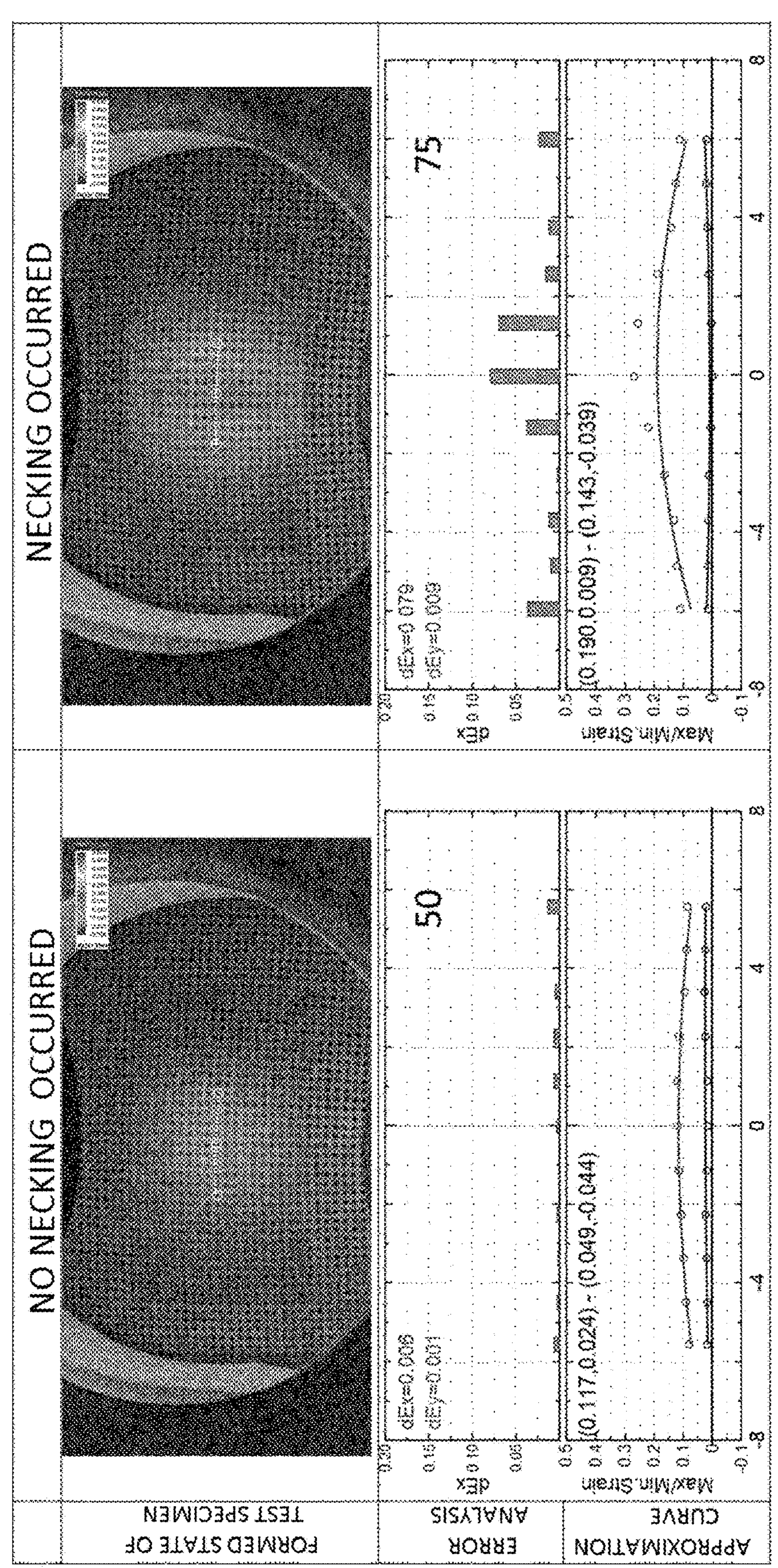
FIG. 3 shows an image of a state in which a test specimen is formed, and graphs of approximation curves, and error analysis, representing an example of the method for determining the occurrence of necking by drawing approximation strain curves using a quadratic polynomial.

FIG. 2 shows a schematic block diagram of a system suitable for use in the metal sheet forming limit determination method according to the foregoing embodiment. A metal sheet forming limit determination system 100 includes a forming test machine 10, a strain measuring device 20, and a forming limit analysis device 30. Further, the forming limit determination system 100 may include a strain distribution display device 40.

The forming test machine 10 includes a die 2, a blank holder 4, a punch 3, and an image-capturing means 5. The die 2 has an annular shape with a central hole, and the blank holder 4 similarly has an annular shape with a central hole. The punch 3 is in the shape of a solid round bar. The tip end of the punch 3 has a convex curved surface that is approximately hemispherical in shape. A test specimen 1 of a metal sheet with an arbitrary lattice or a pattern for strain analysis on the surface is disposed between the die 2 and the blank holder 4 that are placed in a press machine. Then, the die 2 is pressed against the blank holder 4 with the press machine, for example, so that the test specimen 1 is clamped. FIG. 2 shows an example in which press forming is performed by raising the punch 3 with the press machine in such a state and then pushing the central portion of the test specimen 1 upward with the tip end of the punch 3. Changing the shape of the test specimen and the mechanism of the blank holder in various ways can perform a forming test for determining a fracture limit for equibiaxial deformation (FIG. 4(*c*)), non-equibiaxial deformation (FIG. 4(*b*)), plane strain deformation (FIG. 4(*a*)), or uniaxial deformation. Although the foregoing example has a configuration in which the punch is pushed upward from below, the punch may be configured to be pushed downward or in a direction rotated by 90°.

The forming test machine 10 in this embodiment is configured to allow, for example, a high-speed camera as the image-capturing means 5 to obtain a high-resolution image of a surface of the test specimen 1 on the side opposite to the side pressed by the punch 3, as shown in FIG. 2. An arbitrary lattice, such as lattice lines, lattice points, a Kagome lattice, or scribed circles; or a pattern for strain analysis, for example, has been transferred to the surface to be observed of the test specimen 1. In the example of FIG. 2, two high-speed cameras 5 are used to shoot the 3D deformations of the lattice and the like that appear on the surface of the test specimen 1 during formation. The pattern for strain analysis may be a random pattern, such as a speckle pattern.

The strain measuring device 20 includes an image analysis unit 21, a strain measurement unit 22, and a strain data accumulation unit 23. The forming limit analysis device 30 includes a strain extraction unit 31, a strain curve approximation unit 32, an approximation error analysis unit 33, and a forming limit determination unit 34. Each of the strain measuring device 20 and the forming limit analysis device 30 may include other units such as a control unit, a storage unit, an operating unit, a display unit, and a communication unit (not shown), which may be connected via a bus.

The control unit is a computer including a central processing unit (CPU), a random access memory (RAM), and other components. The CPU of the control unit reads a system program and various processing programs stored in the storage unit, for example, a storage area, which stores programs, in the storage unit, and develops the read programs into the work area of the RAM in response to an operation performed on the operating unit. The CPU executes various processes described below in accordance with the developed programs, and implements the respective functions of the strain measuring device 20 and the forming limit analysis device 30. In addition, the CPU receives, via a bus, signals and data from other components, transmits control signals and instructions, receives images by the image-capturing means 5 via the communication unit, and transmits and receives strain data. The communication unit is configured to perform wired or wireless communication with other devices.

The storage unit includes a nonvolatile semiconductor memory, such as an SSD (Solid State Drive), and a hard disk (HDD: Hard Disk Drive). The storage unit may also include a removable flash memory and the like. The storage unit stores various programs, such as programs for executing various processes with the control unit, and parameters necessary to execute processes of the programs, or data, such as the results of the processes. The various programs stored in the storage unit are stored in the form of program code that can be read by a computer, and the control unit sequentially executes operations in accordance with the program codes.

In the present embodiment, the storage unit of the strain measuring device 20 stores programs for performing various processes described below. The processes include an image analysis process for analyzing images of the surface of the test specimen obtained with the image-capturing means 5 to acquire a strain distribution, a strain measurement process for calculating the representative values of strain from the obtained strain distribution, and a strain data accumulation process for storing the representative values of strain in time series from the start of forming to the occurrence of fracture to construct a strain database.

In the present embodiment, the storage unit of the forming limit analysis device 30 stores programs for performing various processes described below. The processes include a strain extraction process for setting an evaluation point sequence on the test specimen for acquiring a strain distribution in the vicinity of the portion where fracture has occurred and then extracting the representative value of strain at the position of the evaluation point sequence in a given forming step from the strain database of the strain data accumulation unit; a strain curve approximation process for calculating an approximation strain curve corresponding to the position of the evaluation point sequence from the extracted representative value of the strain; and an approximation error analysis process for determining, as an approximation error, the difference between the strain at the position of the evaluation point sequence based on the calculated approximation strain curve and the strain at the position of the evaluation point sequence measured by analyzing the images. Further, the processes include a forming limit determination process for determining the forming limit from the obtained approximation error.

The strain distribution display device 40 can be configured as a display unit of the forming limit analysis device 30. Examples of the strain distribution display device 40 include monitors of a liquid crystal display (LCD), a CRT, and an organic light-emitting diode (LED). The storage unit of the forming limit analysis device 30 stores a display process program for selecting the content to be displayed.

The communication unit includes an adapter and modem for LAN (Local Area Network), a wireless communication device, and other devices to control the transmission and reception of various data to/from each device connected to a communication network. The communication unit may include an interface for communication, such as a network card. The communication unit can transmit and receive various data to/from external devices. For example, image data obtained by the image-capturing means 5 and the like are input to the strain measuring device 20 via the communication unit. The operating unit includes a keyboard having cursor keys, number input keys, and various function keys; a mouse; and a pointing device, such as a touch panel. The operating unit outputs to the control unit an instruction signal input through a key operation or a mouse operation, for example.

Although FIG. 2 illustrates an example in which the forming test machine 10, the strain measuring device 20, and the forming limit analysis device 30 are configured as different computers, they may be controlled by a single computer, or may be divided into different devices for different functions.

Figures 11A, 11B:
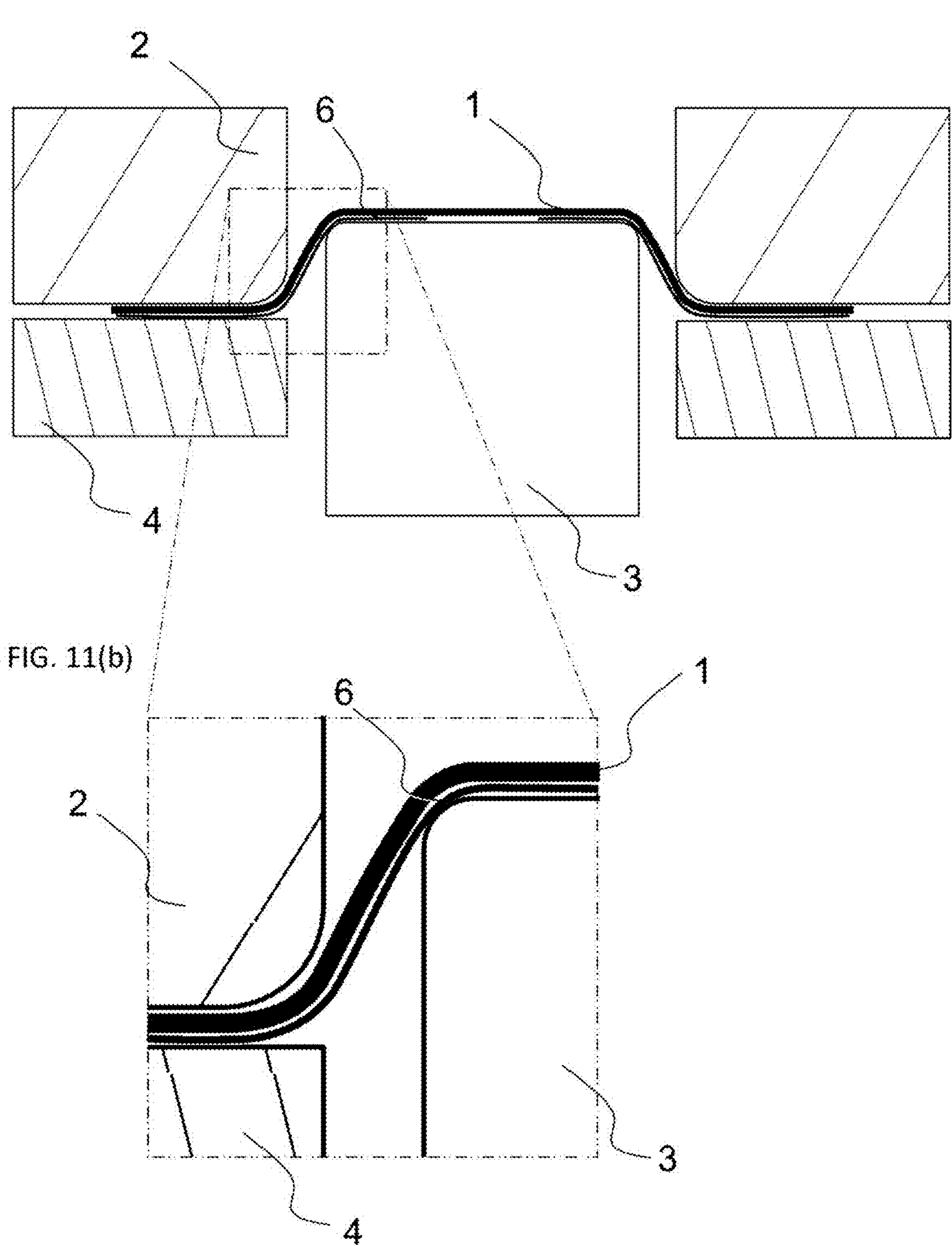
FIG. 11 is a schematic view representing the shape of a die used in a forming test according to another embodiment of the present invention in which FIG. 11(*a*) is a side cross-sectional view, and FIG. 11(*b*) is a partially enlarged view of FIG. 11(*a*).
Figure 12:
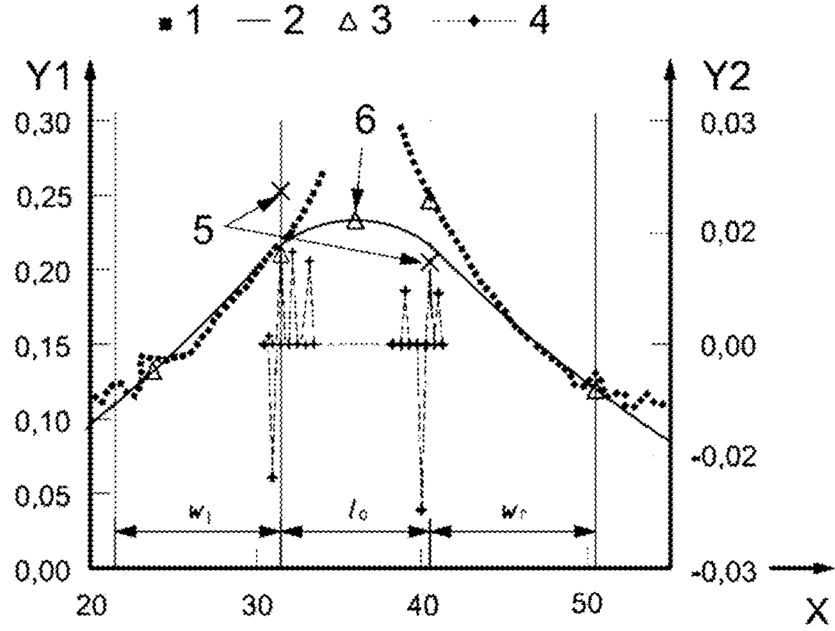
FIG. 12 is a graph illustrating a forming limit determination method described in Non Patent Literature 1.
Figure 13:
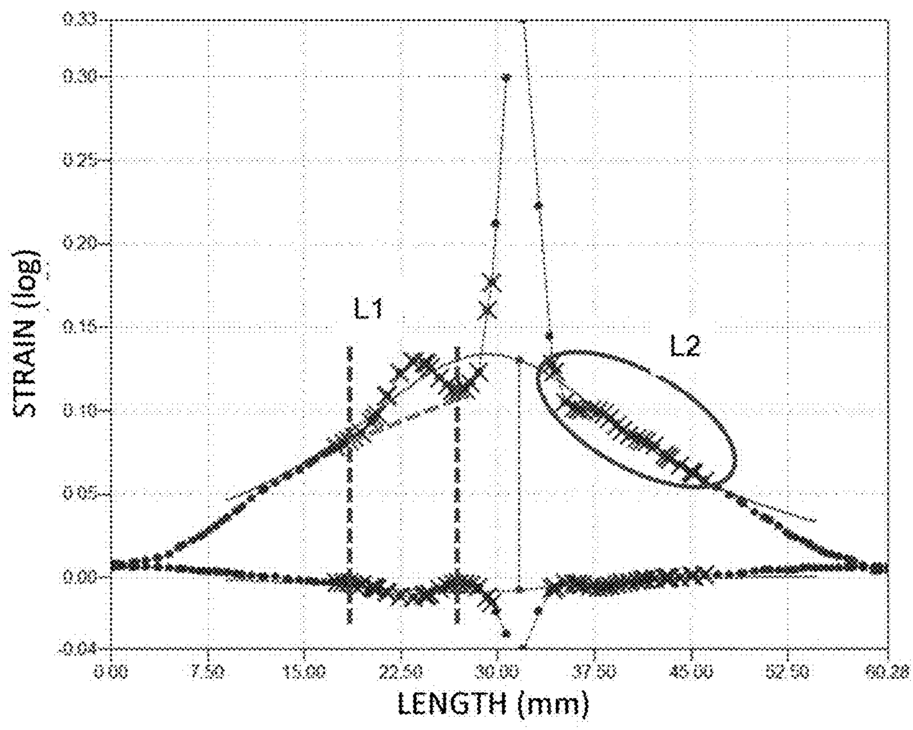
FIG. 13 is a graph representing an example of an approximation error of a strain curve based on Non Patent Literature 1.
Figure 14:
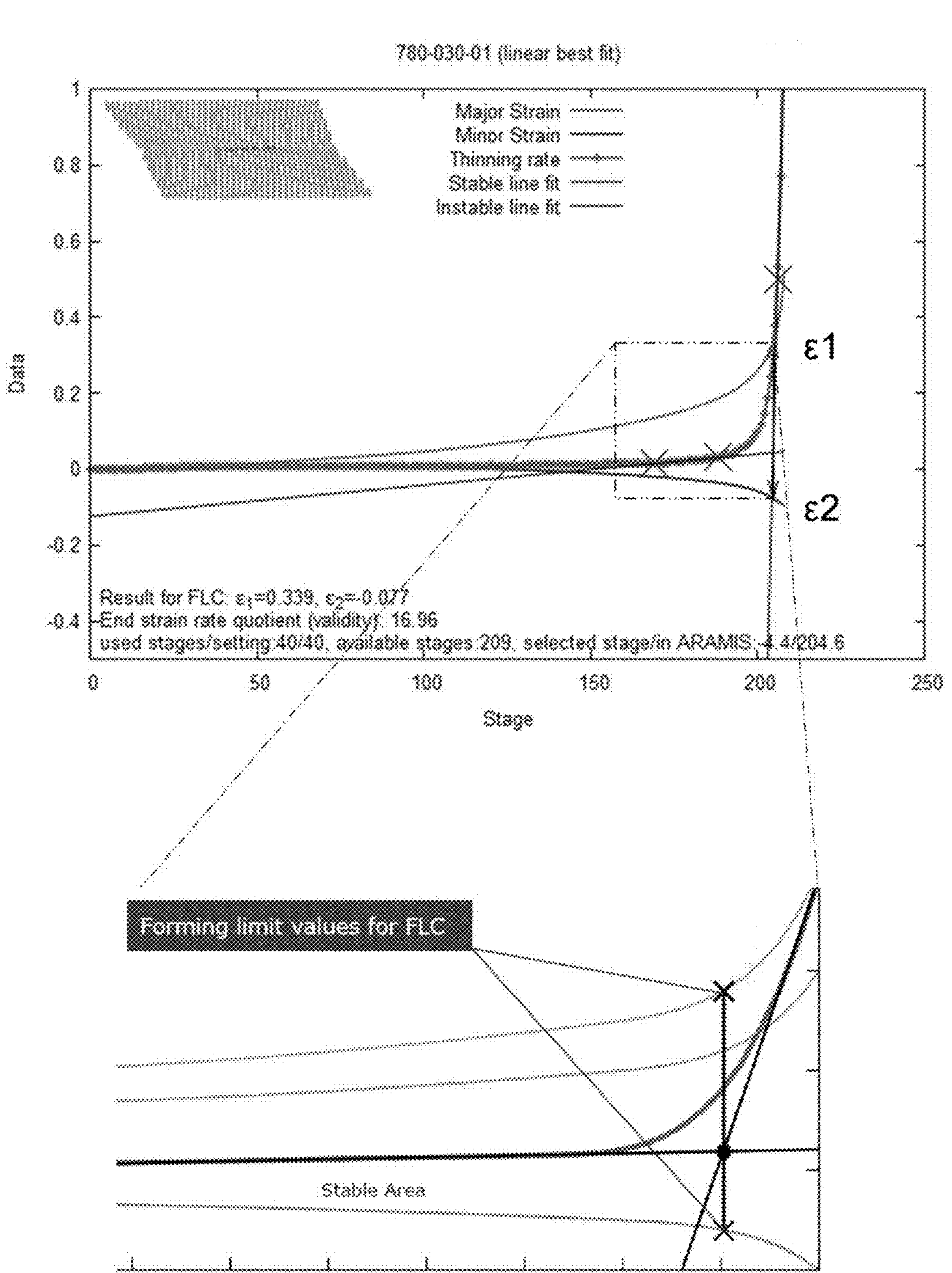
FIG. 14 is a graph illustrating a forming limit determination method described in Non Patent Literature 2.

FIG. 11(*a*) illustrates a side cross-sectional schematic view of the shape of a die used in a forming test performed with the Marciniak method according to another embodiment. FIG. 11(*b*) is a partially enlarged view of FIG. 11(*a*). As shown in FIG. 11, in the Marciniak method, the die 2 has an annular shape with a central hole, and the blank holder 4 similarly has an annular shape with a central hole. The punch 3 is in the form of a solid round bar. The tip end of the punch 3 has a so-called flat head portion that is approximately cylindrical in shape, and has an outer diameter that is smaller than the annular inner diameter of the die 2. A drive plate 6 with a central hole is arranged between the test specimen 1 of the metal sheet with an arbitrary lattice or a pattern for strain analysis on the surface and the punch 3. Then, the die 2 is pressed against the blank holder 4 with the press machine, so that the test specimen 1 and the drive plate 6 are clamped between the die 2 and the blank holder 4. FIG. 11 shows an example in which press forming is performed by raising the punch 3 with the press machine in such a state and pushing the drive plate 6 upward with the tip end of the punch 3. The following operation, measurement of strain, and analysis of the forming limit are performed as in the foregoing embodiment. In this embodiment, the contact between the test specimen 1 and the punch 3 can be avoided, thus eliminating the influence of friction.

Example

Figures 4A, 4B, 4C:
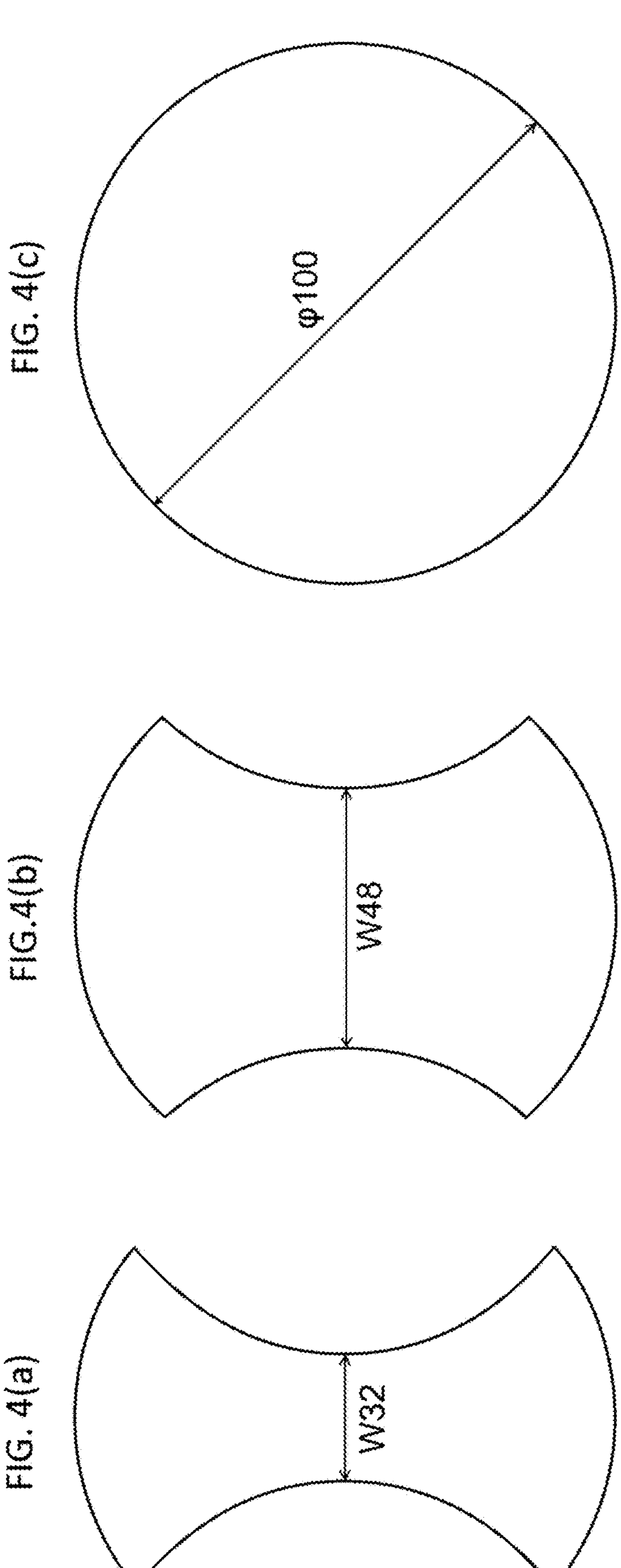
FIG. 4 is a plan view showing examples of the shapes of a test specimen used in a forming test according to the foregoing embodiment, FIG. 4(*a*) representing a test specimen for plane strain, FIG. 4(*b*) representing a test specimen for a non-equibiaxial bulging test, and FIG. 4(*c*) representing a test specimen for a uniform equibiaxial bulging test.
Figures 5A, 5B:
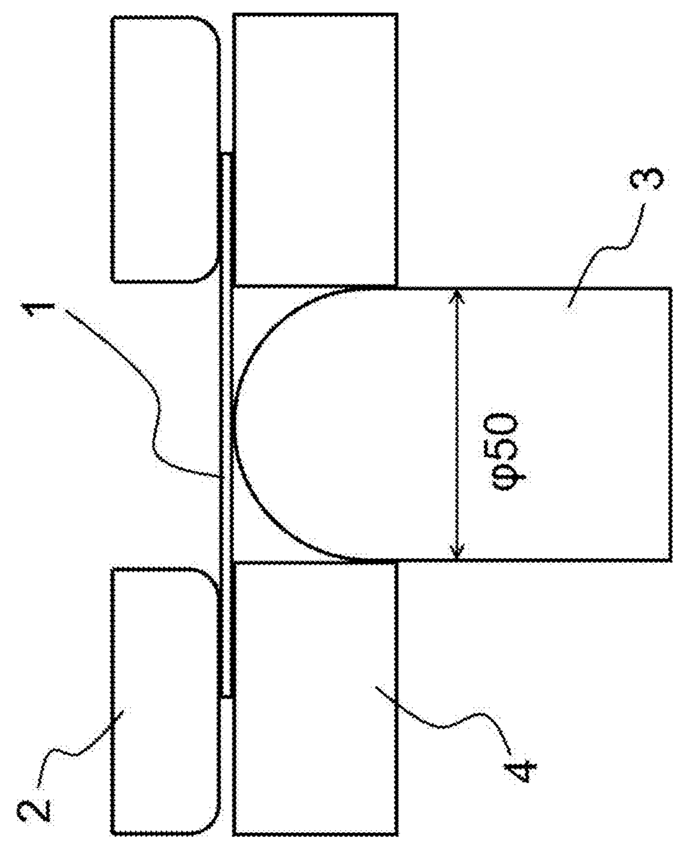
FIG. 5 is a schematic view showing the shape of a die used in the forming test according to the foregoing embodiment, wherein FIG. 5(*a*) is an oblique projection view, and FIG. 5(*b*) is a side cross-sectional view.

The forming limit of a high-strength steel sheet with a tensile strength of 980 MPa-level and with a thickness of 1.6 mm was evaluated based on the foregoing embodiment. To measure the forming limit under various strain conditions, various blank test specimens 1 were prepared, with a notch in the width based on a circular blank with a diameter $\phi$ of 100 mm, as shown in FIG. 4. A hydraulic deep drawability testing machine was used as a forming test machine. As shown in FIG. 5, a forming die includes a punch with a spherical head and a diameter $\phi$ of 50 mm as the punch 3, an upper die with a shoulder part radius R of 5 mm as the die 2, and the blank holder 4. To suppress the inflow of the test specimen 1 during the test, forming was performed at a punch rate of 5 mm/min with a blank holding force of 50 tnf (490 kN) applied. The amount of strain of the surface on the test specimen 1 was measured with the image analysis cameras 5 provided above the die. Photographs were taken at intervals of 1 step/s from the start of the forming to the occurrence of fracture.

Figure 6:
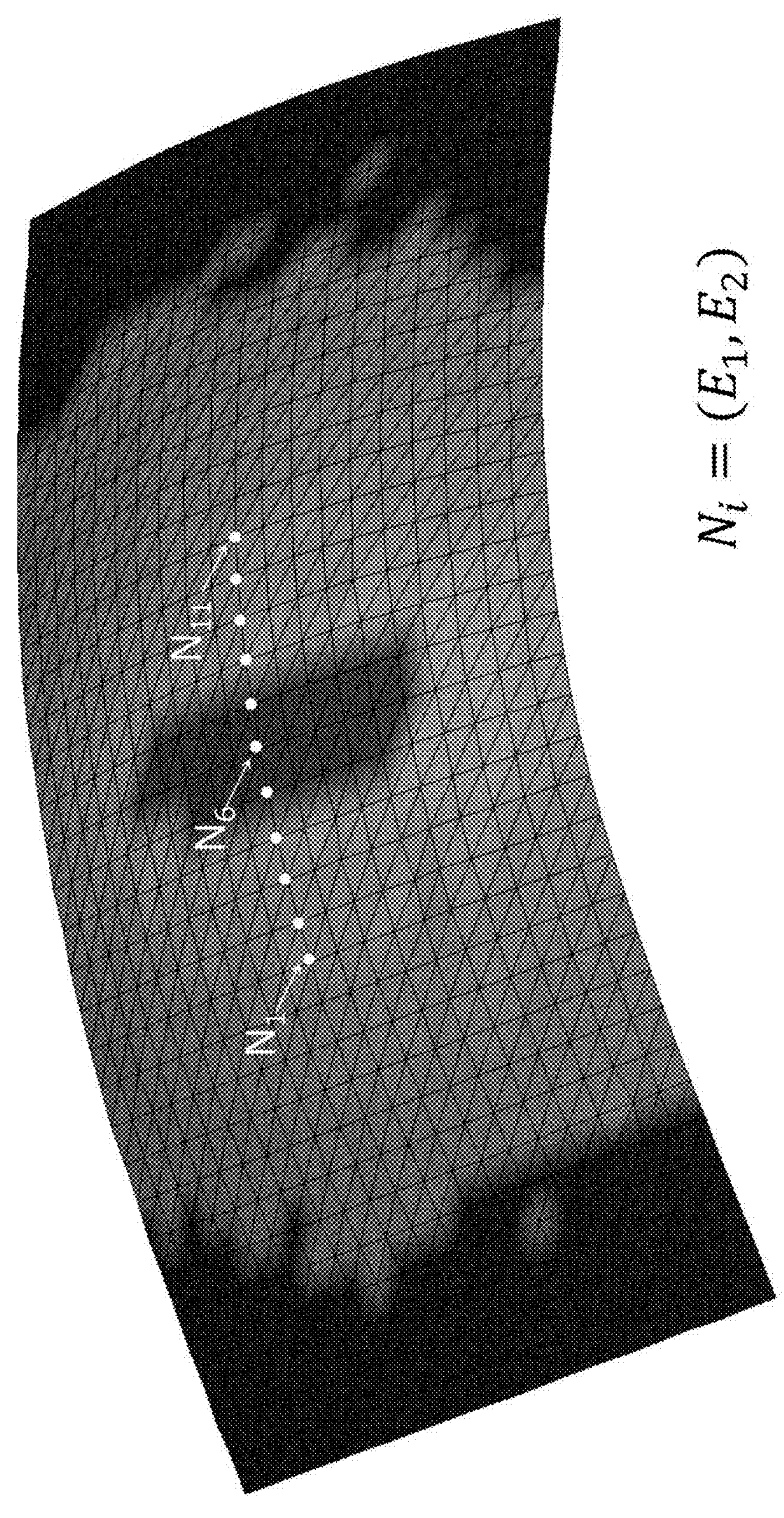
FIG. 6 is a schematic view illustrating a state in which a forming limit evaluation point sequence is set on an image of a strain distribution of a test specimen.
Figure 7:
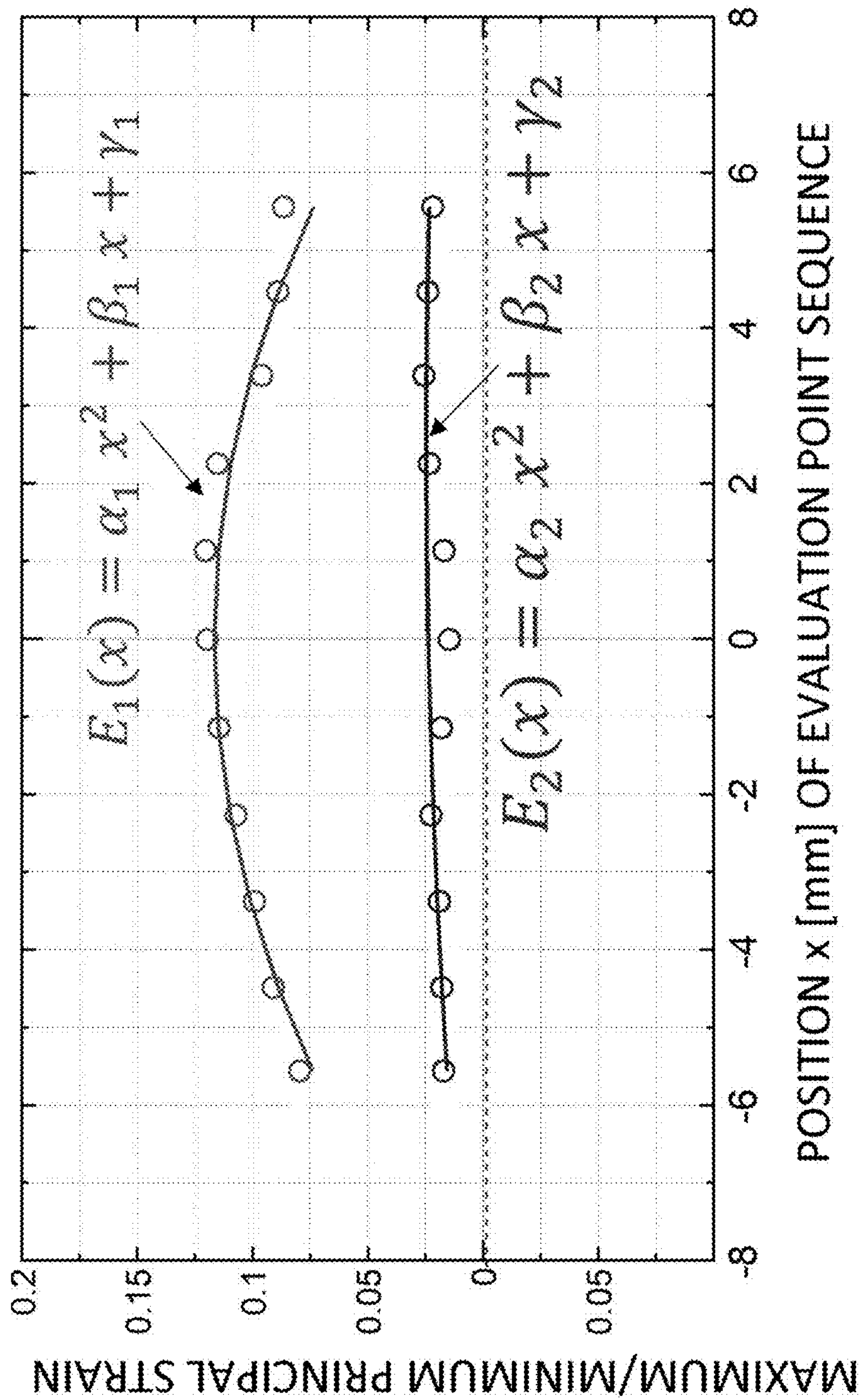
FIG. 7 is a graph illustrating a state in which strain distribution curves at the position of the forming limit evaluation point sequence are obtained through approximation using quadratic polynomials.

After forming was completed, the forming limit was analyzed based on the foregoing embodiment. An evaluation point sequence including 11 points shown in FIG. 6 was set so as to cross the position where fracture had occurred. The maximum principal strain $E_1$ and the minimum principal strain $E_2$ measured in the forming test were acquired for each evaluation point sequence, and were approximated by curves based on the quadratic polynomials of Expressions (a) and (b) above. Such a process was automatically performed with software for identifying parameters using the least-squares method introduced into an analysis computer. FIG. 7 shows an example in which each of the maximum strain and the minimum strain corresponding to the evaluation point sequence was approximated by a curve in step 50. Table 1 below shows the parameters obtained at this time.

TABLE 1

| Forming step | $\alpha_1$ | $\beta_1$ | $\gamma_1$ | $\alpha_2$ | $\beta_2$ | $\gamma_2$ |
|---|---|---|---|---|---|---|
| 50 | $1.17 \times 10^{-01}$ | $-3.91 \times 10^{-05}$ | $-1.39 \times 10^{-03}$ | $2.38 \times 10^{-02}$ | $6.95 \times 10^{-04}$ | $-1.37 \times 10^{-04}$ |

Figure 8:
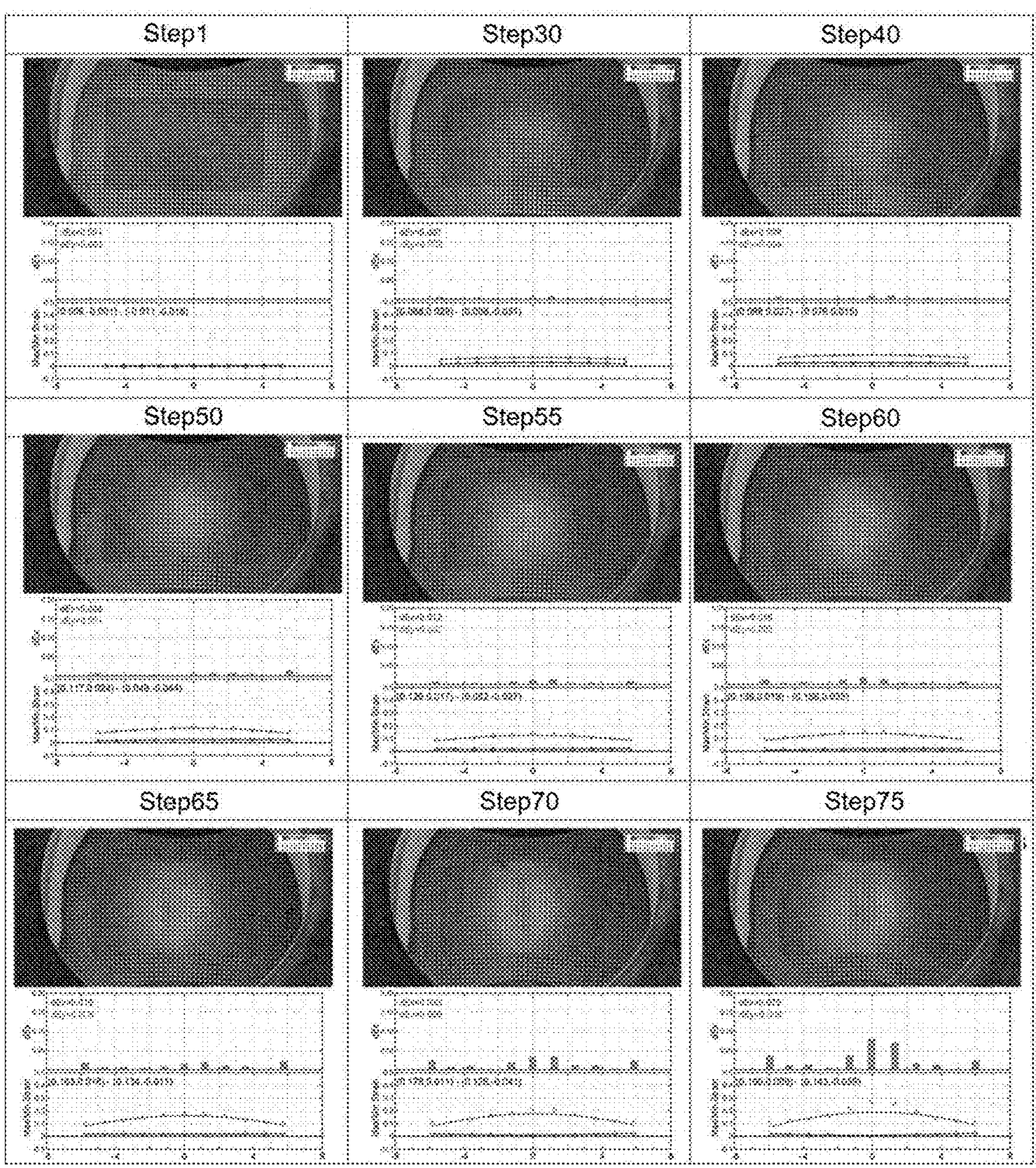
FIG. 8 is a view illustrating an image of a strain distribution and a display example of approximation strain distribution curves at the position of the evaluation point sequence for each forming step.
Figure 9:
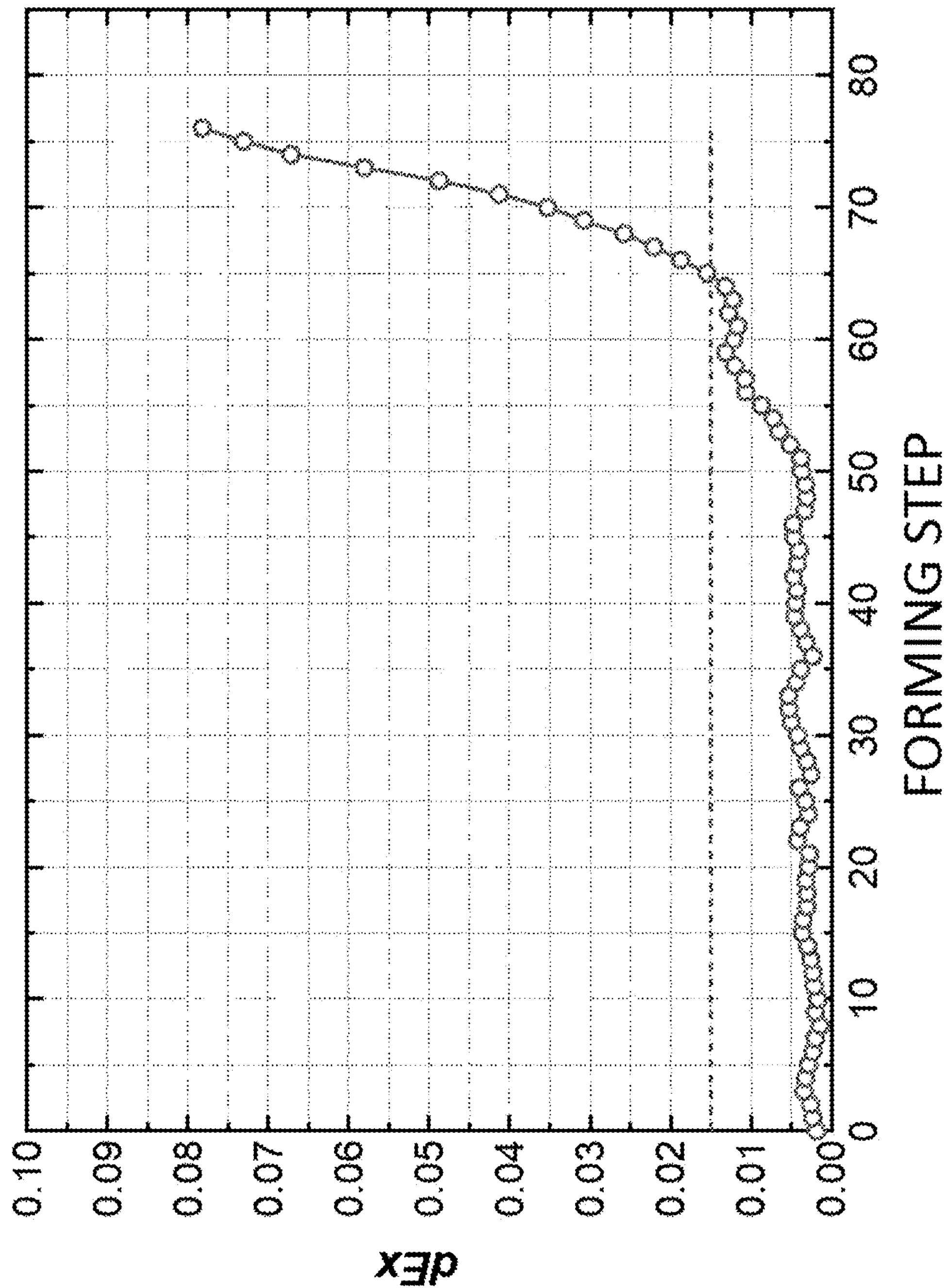
FIG. 9 is a graph obtained by plotting an approximation error dEx of a strain distribution for a forming step.

This process of approximating a strain distribution by curves was repeated for the strain data measured at intervals of 1 second during the forming. Then, an image displaying the strain distribution generated in the test specimen in color, and an image displaying a graph showing the values of the evaluation point sequence and the approximation curves, for each step. These images were displayed on the computer display to determine if necking had occurred in each step. FIG. 8 shows the results of the analysis for steps 0, 30, 40, 50, 55, 60, 65, 70, and 75. An approximation error between the strain based on the approximation strain curve and the strain at the position of the evaluation point sequence is also displayed, so that it can be quantitatively determined whether necking has occurred from the state of the approximation error. A history of an error dEx for the dangerous fracture portion was displayed for each step, and a step corresponding to the time point when the error exceeded a predetermined error threshold was determined to correspond to the forming limit. In the foregoing example, as shown in FIG. 9, the error threshold was set to 0.015, and step 65 was determined to correspond to the strain state of the forming limit.

Figure 10:
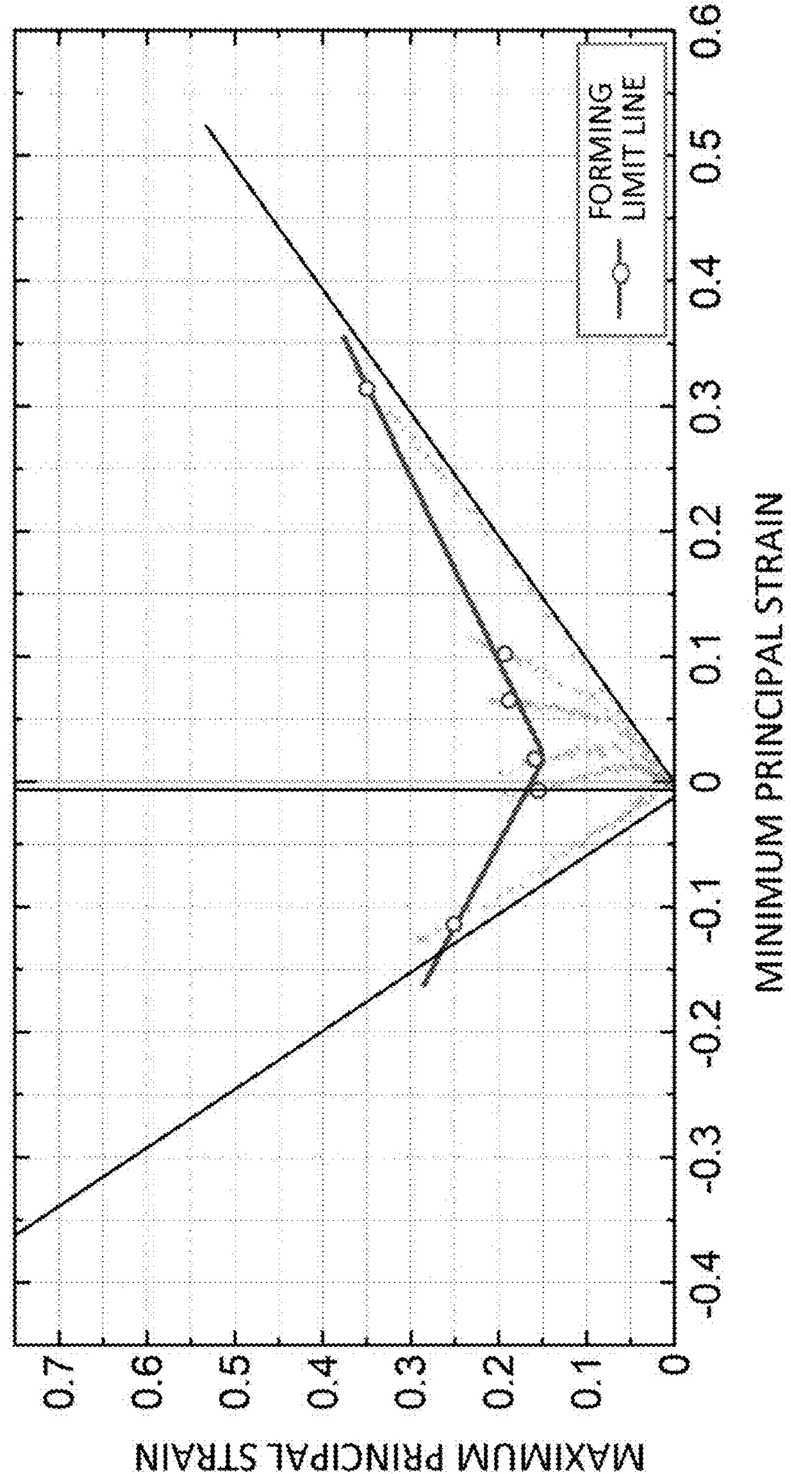
FIG. 10 is a graph illustrating an example of a forming limit line obtained in the foregoing embodiment.

A forming test was performed on, for example, each test specimen having different strain states in FIG. 4, and the foregoing process was repeated to identify the forming limit for each strain state. As a result, the result of FIG. 10 was obtained as the forming limit line. In FIG. 10, where the abscissa axis represents the minimum principal strain and the ordinate axis represents the maximum principal strain, the strain coordinates of each of the test specimens corresponding to equibiaxial deformation, non-equibiaxial deformation, plane strain deformation, and uniaxial deformation, for example, were point-plotted for each step, and the forming limit strain coordinates were plotted as hollow circles. Then, the forming limit strain coordinates were connected to form a forming limit line.

INDUSTRIAL APPLICABILITY

According to the present invention, it is possible to accurately grasp the forming limit of a metal sheet like a high-strength steel sheet that may undergo necking at a small amount of strain. Thus, the present invention allows for the design of the shapes of products to be formed with a high yield, and thus is industrially advantageous.

REFERENCE SIGNS LIST

1 test specimen (metal sheet)
2 die
3 punch
4 blank holder
5 image-capturing means (high-speed camera)
6 drive plate
10 forming test machine
20 strain measuring device
21 image analysis unit
22 strain measurement unit
23 strain data accumulation unit
30 forming limit analysis device
31 strain extraction unit
32 strain curve approximation unit
33 approximation error analysis unit
34 forming limit determination unit
40 strain distribution display device
100 forming limit determination system

The invention claimed is:

1. A metal sheet forming limit determination method comprising a forming test step and a forming limit analysis step for a metal sheet, wherein:

the forming test step comprises a step of preparing a test specimen of a metal sheet with an arbitrary lattice or a pattern for strain analysis displayed on the surface, a step of forming the test specimen while capturing an image of the surface of the test specimen with the lattice or the pattern for strain analysis displayed on the surface, a step of analyzing images captured sequentially during the forming to measure strain generated in the metal sheet, and a step of storing the measured strain in time series from a start of the forming to occurrence of fracture to construct a strain database, and that the forming limit analysis step comprises a step of setting, on the test specimen, an evaluation point sequence for acquiring a strain distribution in the vicinity of a portion where fracture has occurred, a step of extracting, from the strain database, the strain at a position of the evaluation point sequence in an arbitrary forming step, a step of calculating, from the extracted strain, an approximation strain curve corresponding to the position of the evaluation point sequence, a step of determining, as an approximation error, a difference between the strain at the position of the evaluation point sequence based on the calculated approximation strain curve and strain at the position of the evaluation point sequence measured by analyzing the images, and a step of determining a forming limit based on the obtained approximation error.

2. The metal sheet forming limit determination method according to claim 1, wherein the approximation strain curve is a polynomial function.

3. The metal sheet forming limit determination method according to claim 1, wherein the step of determining a forming limit comprises determining that necking has occurred in a forming step in which the approximation error has exceeded a predetermined threshold and determining, as the forming limit, strain at the evaluation point sequence on the metal sheet in the forming step or one step earlier than the forming step.

4. The metal sheet forming limit determination method according to claim 1, wherein the step of determining a forming limit displays the approximation strain curve, and a strain distribution in the vicinity of the evaluation point sequence.

5. The metal sheet forming limit determination method according to claim 1, wherein the forming test step comprises performing forming tests for a plurality of test specimens having different shapes, and the forming limit analysis step comprises determining a forming limit for each test specimen to obtain a forming limit line.

6. A computer program for executing the metal sheet forming limit determination method according to claim 1, wherein the computer program uses a computer to function as a forming test means and forming limit analysis means.

7. A metal sheet forming limit determination system comprising a forming test machine, a strain measuring device, and a forming limit analysis device, wherein:

the forming test machine is configured to perform press forming by, while clamping a test specimen of a metal sheet with an arbitrary lattice or a pattern for strain analysis displayed on the surface between a die and a blank holder, pressing a central portion of the test specimen with a tip end of a punch that is fitted into a forming test portion in a central hole of the die through a central hole of the blank holder, and comprises an image-capturing means for capturing an image of the surface of the test specimen during the press forming; that the strain measuring device comprises an image analysis unit that analyzes images of the surface of the test specimen obtained by the image-capturing means to acquire a strain distribution, a strain measurement unit that calculates strain from the obtained strain distribution, and a strain data accumulation unit that stores strain in time series from a start of the forming to occurrence of fracture to construct a strain database; and that the forming limit analysis device comprises a strain extraction unit that sets, on the test specimen, an evaluation point sequence for acquiring a strain distribution in the vicinity of a portion where fracture occurs, and extracts the strain at a position of the evaluation point sequence in an arbitrary forming step from the strain database of the strain data accumulation unit, a strain curve approximation unit that calculates from the extracted strain an approximation strain curve corresponding to the position of the evaluation point sequence, an approximation error analysis unit that determines, as an approximation error, a difference between the strain at the position of the evaluation point sequence based on the calculated approximation strain curve and strain at the position of the evaluation point sequence measured by analyzing the images, and a forming limit determination unit that determines a forming limit based on the obtained approximation error.

8. The metal sheet forming limit determination system according to claim 7, wherein the forming test machine has a drive plate interposed between the test specimen and the punch.

9. The metal sheet forming limit determination system according to claim 7, further comprising a display device that displays the approximation strain curve, and a strain distribution in the vicinity of the evaluation point sequence.

* * * * *